United States Patent Office 2,882,313
Patented Apr. 14, 1959

2,882,313

PRODUCTION OF ORGANIC PHOSPHONYL HALIDES

Jack Kwiatek, North Arlington, and John W. Copenhaver, Short Hills, N.J., assignors to The M. W. Kellogg Company, Jersey City, N.J., a corporation of Delaware No Drawing. Application June 28, 1954
Serial No. 439,860

20 Claims. (Cl. 260—543)

This invention relates to a new process for the production of organic phosphonyl halides. In one of its aspects, it relates to a new process for the production of organic phosphonyl halides containing an organic radical linked to phosphorus by a carbon bearing a singly bonded oxygen atom.

An interesting class of organic phosphonyl halides is that in which the carbon linked to phosphorus bears a singly bonded oxygen atom. These compounds are useful in themselves or as constituents of insecticides and fungicides, and are much in demand as intermediate chemical reactants for the production of more complex organic phosphorus-containing compounds which are valuable in various technological applications, for example, as plasticizers, flame proofing agents for textiles, petroleum additives to improve the stability and quality of lubricating oils, and polymer additives. Therefore a general method for production of such organic phosphonyl halides on a commercial scale has been much desired.

The object of this invention is to produce an organic phosphonyl halide.

It is a further object of this invention to provide a method for the production of organic phosphonyl halides in which the organic radical is linked to phosphorus by a carbon atom bearing a singly bonded oxygen atom.

Another object is to provide a new and direct method for the production of such organic phosphonyl halides in relatively high yields with high selectivity.

Still another object is to provide a new method for the production of such organic phosphonyl halides with the maximum utilization of reactants and the minimum formation of by-products.

A further object is to provide a new method for the production of such compounds which involves a simple mode of operation and the use of simple equipment and apparatus.

A still further object is to provide a new method for the direct production of alkoxy alkane phosphonyl dihalides and more particularly of alkoxy methane phosphonyl dichlorides.

Various other objects and advantages of the present invention will become apparent to those skilled in the art from the accompanying description and disclosure.

In accordance with this invention an organic oxygen-activated halide containing at least one halogen atom linked to a carbon bearing a singly bonded oxygen atom, represented by the abbreviated formula

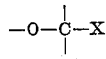

and an alkoxy dihalophosphine are reacted under anhydrous conditions in the presence of a Friedel-Crafts type catalyst to produce an organic phosphonyl halide in which the organic radical linked to phosphorus is a carbon bearing a singly bonded oxygen atom. The cleavage of the carbon-halogen bond of the organic oxygen-activated halide reactant is facilitated by the presence of the oxygen atom on the carbon bearing the halogen atom, and thus the reaction proceeds in good yield at relatively low temperatures. An atom of halogen on any carbon atom bearing a singly bonded oxygen atom will hereinafter be referred to as the oxygen-activated halogen. The organic phosphonyl halide produced as the product of this process is recovered directly from the reaction mixture by conventional methods, such as distillation or is reacted with other reactants to form derivatives thereof and the derivatives recovered.

Various alkoxy dihalophosphines having the general formula $R^1O-PX_2$ are employed in which $R^1$ is an alkyl group and X is any of the halogens (F, Cl, Br, I) and the X's may be the same or different. The preferred type of alkoxy dihalophosphine is that in which $R^1$ is a relatively low molecular weight alkyl group, such as those having not more than about 6 carbon atoms per molecule. The especially preferred alkoxy dihalophosphines are those in which $R^1$ is a methyl or ethyl group, inasmuch as such compounds are readily available, inexpensive and lead to the formation of volatile by-products ($R^1-X$) which are easily removed from the reaction mixture as they are formed. It is particularly desirable for such by-products to be separated from the reaction mixture as soon as they are formed inasmuch as undesirable side reactions are thereby maintained at a minimum. Suitable specific alkoxy dihalophosphines are: methoxy dichlorophosphine, methoxy dibromophosphine, ethoxy difluorophosphine, ethoxy dichlorophosphine, ethoxy diiodophosphine, propoxy dichlorophosphine, etc. The choice of alkoxy dihalophosphine reactant with regard to the nature of the halogen atoms which it contains depends upon the type of organic phosphonyl dihalide desired. For example when producing an organic phosphonyl dichloride, an alkoxy dichlorophosphine is the preferred type of such a reactant.

The alkoxy dihalophosphines are obtained by the addition of an appropriate alcohol to a moderate excess of a phosphorus trihalide, mild warming being necessary for the production of such compounds from the higher molecular weight alcohols.

The organic oxygen-activated halides used in accordance with this invention are those having at least one halogen atom linked to a carbon bearing a singly bonded oxygen atom and are selected from the group consisting of the α-halogenated cyclic ethers and the oxygen- and halogen-containing organic compound having the general formula:

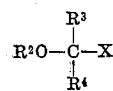

where $R^2$ is an organic radical linked to the oxygen atom by a carbon to oxygen bond and is selected from the group consisting of the alkyl, cycloalkyl, halo-alkyl, aralkyl, aryl, acyl, aroyl, and alkoxy carbonyl groups having not more than about 12 carbon atoms; $R^3$ is selected from the group consisting of an atom of hydrogen, and the alkyl, alkoxy and aryl groups having not more than 12 carbon atoms; $R^4$ is selected from the group consisting of atoms of halogen and hydrogen; and X is a halogen with an atomic weight preferably above 20 (Cl, Br, I). Types of organic oxygen activated halides having the general formula $R^2-O-CR^3-R^4X$ are the α-halogenated organic ethers including the α-halodialkyl ethers, the α-haloalkyl cycloalkyl ethers, the α-haloalkyl aryl ethers and the α-haloalkyl aralkyl ethers; and the α-haloalkyl esters of inorganic and organic acids.

Typical examples of the α-halocyclic ethers which are useful in accordance with this invention are: 2-chloro-dioxane-1,4 and 2-bromofuran.

Examples of typical α-halogenated organic ethers having the general formula, $R^2O$—$CR^3R^4X$, which are useful are the unsymmetrical alpha-haloalkyl mono- and di-ethers such as: chloromethyl methyl ether, α-bromopropyl ethyl ether, α-chloropropyl butyl ether, chloromethyl β-chloroethyl ether, dimethoxydibromomethane, dichloromethyl methyl ether, iodomethyl benzyl ether, and α-chlorobenzyl methyl ether; the symmetrical α-halo alkyl ethers such as: bis-bromomethyl ether and bis-dichloromethyl ether; the α-haloalkyl cycloalkyl ethers such as: α-bromoethyl cyclohexyl ether; and the α-haloalkyl aryl ethers such as: α-chloroisoamyl phenyl ether. The α-haloalkyl esters of organic acids which are useful are exemplified by the following: α-bromoethyl acetate, chloromethyl butyrate and α-chloropropyl benzoate; and the α-haloalkyl esters of inorganic esters as exemplified by chloromethyl methyl carbonate.

An illustrative type equation representing the reaction of the presently described process is:

(1) 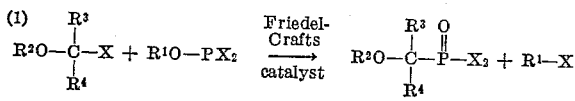

where $R^2$ is an organic radical as described previously and preferably contains not more than 8 carbon atoms, and $R^1$, $R^3$, $R^4$ and X are as defined above; when $R^3$ is an alkyl group it preferably contains not more than 8 carbon atoms. This reaction proceeds in good yield to give an organic phosphonyl halide containing only one phosphonyl dihalo group

when $R^4$ is hydrogen and when $R^2$ is a group other than an alpha-haloalkyl group. When $R^4$ is halogen, and when $R^2$ is a group other than an alpha-haloalkyl group, there are then two oxygen-activated halogen to carbon bonds in the $R^2O$—$CR^3X_2$ reactant and both such bonds are equally susceptible to cleavage under the conditions described herein; when equimolar quantities of reactants are use then the reaction will proceed to give a mixture of products of the type

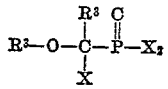

and

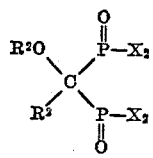

which may be separated, however, by conventional methods, such as by distillation. When $R^4$ is halogen and it is desired to obtain a phosphonyl halide resulting from the cleavage of both oxygen-activated halogen to carbon bonds, it is desirable to use at least twice as many moles of alkoxy dihalophosphine as compared to the number of moles used of the $R^2O$—$CR^3X_2$ compound and the reaction will proceed as shown by illustrative type Equation 2.

(2) 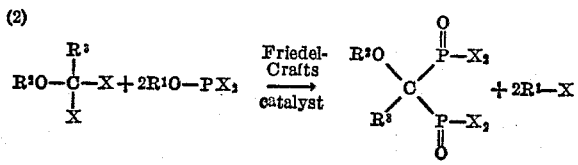

When $R^2$ is an α-haloalkyl group

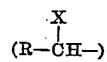

and $R^4$ is hydrogen and at least 2 moles of alkoxy dihalophosphine reactant are used per mole of organic oxygen-ativated halide reactant, then the reaction will proceed as illustrated by illustrative type Equation 3:

(3) 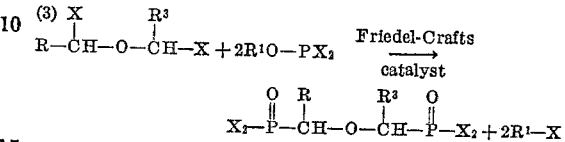

where R is an alkyl group. For every oxygen-activated halogen to carbon bond desired to be cleaved and replaced by a phosphonyl dihalide group, a corresponding number of moles of alkoxy dihalophosphine reactant per mole of organic oxygen-activated halide reactant should be employed.

The process of this invention is carried out in the presence of any of the well-known Friedel-Crafts catalysts, such as ferric chloride, zinc chloride, aluminum chloride, aluminum bromide, and boron trifluoride, preferably under anhydrous conditions. The catalyst is employed in an amount between about 0.005 and about 0.03 mole per mole of organic oxygen-activated halide.

The reaction is conveniently carried out at atmospheric pressure by introducing either one of the reactants and catalyst into any conventional type of reaction vessel equipped with a convenient means of agitation. During the gradual and careful addition of the second reactant there is an initial decrease in temperature followed by a rapid rise in temperature and thus external heating is not recommended until the initial vigorous reaction has subsided. When the reactants and catalyst have been completely admixed the total reaction mixture may then be warmed to hasten the completion of the reaction. Good yields of product are obtained at temperatures between about room temperature (20° C.) and about 125° C., the preferable maximum temperature being about 100° C., for a contact time between about ½ hour and about 15 hours. When employing methoxy dichlorophosphine, the reaction mixture is warmed for about 3 or 4 hours until there is no longer any detectable evolution of gaseous methyl chloride.

The only bonds of the organic oxygen-activated halides which are cleaved during the course of the process as herein described are those between oxygen-activated halogen and carbon as indicated in the equations shown above. It has been found that when one such bond is present the best yields of product are obtained when about equimolar amounts of both reactants are used, a slight molar excess of one or the other reactant not interfering with the course of the reaction. Typical specific examples of the reaction of this process are shown by the following equations.

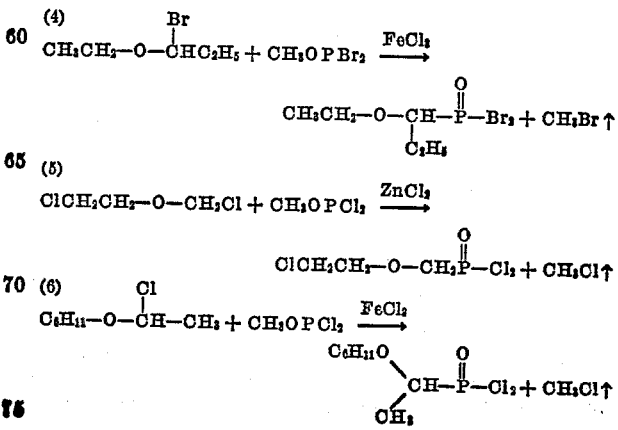

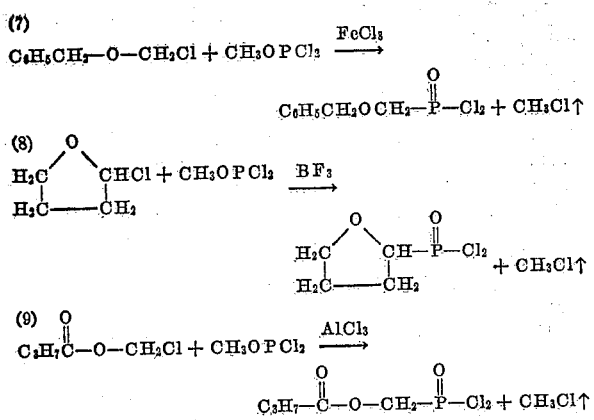

(7) $C_6H_5CH_2-O-CH_2Cl + CH_3OPCl_2 \xrightarrow{FeCl_3}$
$C_6H_5CH_2OCH_2-\underset{\underset{O}{\|}}{P}-Cl_2 + CH_3Cl\uparrow$ (8) $\underset{H_2C-CH_2}{\overset{O}{H_2C\diagup\diagdown CHCl}} + CH_3OPCl_2 \xrightarrow{BF_3}$
$\underset{H_2C-CH_2}{\overset{O}{H_2C\diagup\diagdown CH-\underset{\underset{O}{\|}}{P}-Cl_2}} + CH_3Cl\uparrow$ (9) $C_3H_7\overset{O}{\overset{\|}{C}}-O-CH_2Cl + CH_3OPCl_2 \xrightarrow{AlCl_3}$
$C_3H_7-\overset{O}{\overset{\|}{C}}-O-CH_2-\overset{O}{\overset{\|}{P}}-Cl_2 + CH_3Cl\uparrow$ When employing organic oxygen-activated halides which contain 2 or more active halogen to carbon bonds, the reaction will proceed to give products containing 2 or more phosphonyl dihalide groups as shown by the following typical illustrative equations:

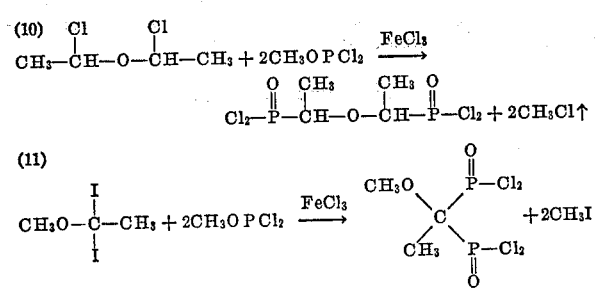

(10) $\underset{Cl}{\overset{Cl}{CH_3-CH-O-CH-CH_3}} + 2CH_3OPCl_2 \xrightarrow{FeCl_3}$
$Cl_2-\overset{O}{\overset{\|}{P}}-\underset{CH_3}{CH}-O-\underset{CH_3}{CH}-\overset{O}{\overset{\|}{P}}-Cl_2 + 2CH_3Cl\uparrow$

(11) $CH_3O-\underset{\underset{I}{I}}{\overset{I}{\overset{|}{C}}}-CH_3 + 2CH_3OPCl_2 \xrightarrow{FeCl_3}$ $\underset{\underset{O}{\|}}{\overset{CH_3O}{\diagdown}}\underset{CH_3\diagup \overset{\|}{\underset{O}{P-Cl_2}}}{C}\overset{P-Cl_2}{\diagup} + 2CH_3I$ When employing such reactants as bis-alphachloroethyl ether and alpha, alpha-dichloroethyl methyl ether, the preferred mole ratio of the alkoxy dihalophosphine reactant to the organic oxygen-activated halide is about 2 or slightly above.

Upon completion of the reaction the product is purified by conventional methods, such as by fractional distillation of liquids under reduced pressure and by crystallization of solid products. Identification of the products is achieved by conventional methods, such as by chemical analysis for percentage composition, and by determination of physical constants and infrared absorption spectra.

The organic phosphonyl halide product may be hydrolyzed by conventional methods known to those skilled in the art to the corresponding phosphonic acid which in turn may be converted to various phosphonic acid esters and amides by conventional methods, or the phosphonyl halides may be converted directly to their corresponding acid derivatives by conventional methods. The ultimate products thus obtained are useful as plasticizers for solid polymers, lubricating oil additives to increase stability at elevated temperatures, etc.

The reaction may be carried out in continuous or batchwise systems without departing from the scope of this invention. The reaction is effected under anhydrous conditions and may be effected in the presence of anhydrous liquid diluents, such as nitrobenzene, diethyl ether and hexane in which the reactants are dissolved or are dispersed by mechanical agitation or emulsifying agents. The amount of diluent constitutes about 25 to about 75 volume percent of the total reaction mixture.

The following examples are offered as a better understanding of the present invention but they are not to be construed as unnecessarily limiting the present invention.

*Example 1*

To a 125 ml. 3-neck flask fitted with a reflux condenser, stirrer and Dry Ice-acetone cooled trap 0.40 mole (53.6 grams) of methoxy dichlorophosphine and 0.008 mole (1.30 grams) of anhydrous ferric chloride were added. From a dropping funnel attached to the reflux condenser, 0.44 mole (35.3 grams) of chloromethyl methyl ether was added dropwise over a period of a half hour. During this addition the temperature rose to 65° C. and the gas evolved was collected in the Dry Ice-acetone trap and found to be methyl chloride. The reaction mixture was warmed an additional 2 hours maintaining the bath temperature at about 75° C. The total reaction mixture was then subjected to vacuum distillation at 1 to 2 mm. of mercury pressure to obtain a liquid boiling from 40° C. to 46° C., and mainly at 41° C., at 1 to 2 mm. of mercury. The crude liquid product was redistilled under vacuum through a modified Claisen head to obtain a fraction boiling at 38.0–41° C., at 0.05–2 mm. of mercury pressure, with the main portion boiling at 40° C. at 0.07 mm. of mercury and representing a 55 percent yield of methoxy methane phosphonyl dichloride.

This fraction analyzed as follows:

| | Percent |
|---|---|
| Cl | 43.2 |
| P | 19.8 |

Calculated for $CH_3OCH_2-P(O)Cl_2$: Cl, 43.6%; P, 19.0%.

Infrared analysis showed this fraction to consist of methoxy methane phosphonyl dichloride.

*Example 2*

A second run using 1.7 moles (137 grams of chloromethyl methyl ether, 1.5 moles (199.4 grams) of methoxy dichlorophosphine and 0.03 mole (4.9 grams) of anhydrous ferric chloride was conducted as described in Example 1 except that the reaction mixture was not heated after addition of the chloromethyl methyl ether to the methoxy dichlorophosphine-ferric chloride mixture. This run gave a 68% yield of methoxy methane dichlorophosphine and 51% of methyl chloride.

The theoretical and typical reaction mechanism advanced in explaining the invention should not be construed as unnecessarily limiting thereto and may not be the only explanation for the reactions and products produced.

It is to be understood that the procedures employed for the isolation of the desired products are varied in accordance with the physical nature of the products as will be apparent to those skilled in the art and that the temperature of reaction, molar quantity of reactants, and type of catalyst to be preferred in any particular instance will depend upon the starting materials employed and the products desired, as well as personal preference.

Having described our invention, we claim:

1. A process which comprises reacting a lower alkoxy dihalophosphine and a compound having the general formula

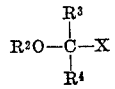

$$R^2O-\underset{R^4}{\overset{R^3}{\underset{|}{\overset{|}{C}}}}-X$$

wherein X is an atom of halogen selected from the group consisting of chlorine, bromine and iodine; $R^2$ is a radical having not more than 12 carbon atoms selected from the group consisting of the alkyl, cycloalkyl, halo-alkyl, aralkyl, aryl, acyl, aroyl and alkoxy carbonyl groups; $R^3$ is selected from the group consisting of hydrogen and the alkyl, alkoxy and aryl groups having not more than 12 carbon atoms per group; and $R^4$ is selected from the group consisting of hydrogen and halogen, in the presence of a Friedel-Crafts catalyst to produce an organic phosphonyl halide as a product of the process.

2. The process of claim 1 in which said Friedel-Crafts catalyst is ferric chloride.

3. The process of claim 1 in which said Friedel-Crafts catalyst is zinc chloride.

4. The process of claim 1 in which said Friedel-Crafts catalyst is aluminum chloride.

5. The process of claim 1 in which said Friedel-Crafts catalyst is boron trifluoride.

6. The process of claim 1 in which said Friedel-Crafts catalyst is aluminum bromide.

7. The process of claim 1 in which said alkoxy dihalophosphine reactant is one in which the alkoxy group has not more than 6 carbon atoms.

8. The process of claim 1 in which said alkoxy dihalophosphine reactant is methoxy dichlorophosphine.

9. The process of claim 1 in which said alkoxy dihalophosphine reactant is methoxy dibromophosphine.

10. The process of claim 1 in which said alkoxy dihalophosphine reactant is ethoxy dichlorophosphine.

11. The process of claim 1 in which said alkoxy dihalophosphine reactant is ethoxy difluorophosphine.

12. The process of claim 1 in which said alkoxy dihalophosphine reactant is propoxy dichlorophosphine.

13. The process of claim 1 in which the reaction is effected at a temperature between about 20° C. and about 125° C.

14. The process of claim 1 in which the compound of said general formula is chloromethyl methyl ether.

15. The process of claim 1 in which the compound of said general formula is chloromethyl α-chloroethyl ether.

16. The process of claim 1 in which the compound of said general formula is iodomethyl benzyl ether.

17. The process of claim 1 in which the compound of said general formula is bis-dichloromethyl ether.

18. A process for the production of methoxy methane phosphonyl dichloride which comprises reacting chloromethyl methyl ether and methoxy dichlorophosphine at a temperature between about room temperature and about 100° C. in the presence of ferric chloride as a catalyst to produce methoxy methane phosphonyl dichloride, and recovering the methoxy methane phosphonyl dichloride thus produced as the product of the process.

19. A process which comprises reacting a lower alkoxy dihalophosphine and an alpha-chlorodialkyl ether having between 1 and 12 carbon atoms per alkyl radical in the presence of a Friedel-Crafts catalyst to produce an organic phosphonyl halide as the product of the process.

20. A process for the production of methoxy methane phosphonyl dichloride which comprises reacting chloromethyl methyl ether and methoxy dichlorophosphine in the presence of a Friedel-Crafts catalyst to produce methoxy methane phosphonyl dichloride, and recovering the methoxy methane phosphonyl dichloride thus produced as the product of the process.

No references cited.

UNITED STATES PATENT OFFICE
Certificate of Correction

April 14, 1959

Patent No. 2,882,313

Jack Kwiatek et al.

It is hereby certified that error appears in the printed specification of the above numbered patent requiring correction and that the said Letters Patent should read as corrected below.

Column 2, line 49, for "compound" read —compounds—; column 3, line 46, for "use" read —used—; lines 49 to 51 inclusive, the formula should appear as shown below instead of as in the patent:

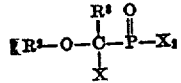

same column 3, lines 53 to 59 inclusive, the formula should appear as shown below instead of as in the patent:

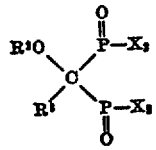

Signed and sealed this 27th day of October 1959.

[SEAL]

Attest:
KARL H. AXLINE,
Attesting Officer.

ROBERT C. WATSON
Commissioner of Patents